United States Patent
Yan et al.

(10) Patent No.: US 11,339,716 B2
(45) Date of Patent: May 24, 2022

(54) INERTIAL PARTICLE SEPARATOR FOR AIRCRAFT ENGINE

(71) Applicant: PRATT & WHITNEY CANADA CORP., Longueuil (CA)

(72) Inventors: Guorong Yan, Brossard (CA); Mark Cunningham, Montreal-Ouest (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 253 days.

(21) Appl. No.: 16/573,013

(22) Filed: Sep. 17, 2019

(65) Prior Publication Data

US 2021/0079840 A1    Mar. 18, 2021

(51) Int. Cl.
  *F02C 7/052*    (2006.01)
  *F02C 7/055*    (2006.01)
  *B64D 33/02*   (2006.01)

(52) U.S. Cl.
  CPC .............. *F02C 7/052* (2013.01); *F02C 7/055* (2013.01); *B64D 2033/022* (2013.01); *B64D 2033/0246* (2013.01)

(58) Field of Classification Search
  CPC .. F02C 7/047; F02C 7/05; F02C 7/052; F02C 7/055; F02C 6/08; F02C 9/18; F02C 9/52; F05D 2260/607; B64D 2033/022; B64D 2033/0246; B64D 2033/0233; B64D 2013/0607; B64D 2013/0666; B64D 15/00–22; B64C 1/067
  See application file for complete search history.

(56) References Cited

U.S. PATENT DOCUMENTS

| | | | | |
|---|---|---|---|---|
| 3,329,377 A | * | 7/1967 | Gudmundur | B64D 15/00 244/53 B |
| 4,702,071 A | | 10/1987 | Jenkins et al. | |
| 4,844,382 A | * | 7/1989 | Raisbeck | B64D 33/02 244/53 B |

(Continued)

FOREIGN PATENT DOCUMENTS

| | | |
|---|---|---|
| EP | 2837797 A1 | 2/2015 |
| EP | 3346109 A1 | 7/2018 |
| RU | 2671256 C1 | 10/2018 |

OTHER PUBLICATIONS

European Search Report issued in counterpart EP application No. 20196673.6 dated Feb. 2, 2021.

*Primary Examiner* — Gerald L Sung
(74) *Attorney, Agent, or Firm* — Norton Rose Fulbright Canada LLP

(57) ABSTRACT

An inertial particle separator, having: an inlet duct defining an intake; an intermediate duct extending from the inlet duct to an engine inlet; a bypass duct in fluid communication with and extending downstream from the inlet duct, the bypass duct defining an outlet communicating with the environment of the aircraft engine, a splitter defined at an intersection of a wall of the bypass duct and a wall of the intermediate duct; a splitter vane within the intermediate duct and having a leading edge located upstream of the splitter relative to a flow circulating through the separator, the splitter vane and the wall of the intermediate duct defining a channel therebetween; and a porous plate extending across the channel and defining openings sized so as to aggregate ice and be blocked by ice under icing conditions.

18 Claims, 3 Drawing Sheets

(56) References Cited

U.S. PATENT DOCUMENTS

| | | | |
|---|---|---|---|
| 5,139,545 A * | 8/1992 | Mann | F02C 7/052 |
| | | | 55/306 |
| 10,167,725 B2 | 1/2019 | Manning et al. | |
| 10,287,980 B2 | 5/2019 | Warnes | |
| 2018/0106224 A1* | 4/2018 | Dionne | F02M 35/0216 |
| 2018/0193782 A1* | 7/2018 | Bisson | F02C 7/052 |
| 2018/0209340 A1 | 7/2018 | Renninger et al. | |

\* cited by examiner

INERTIAL PARTICLE SEPARATOR FOR AIRCRAFT ENGINE

TECHNICAL FIELD

The application relates generally to aircraft engine inlets and, more particularly, to particle separation at such inlets.

BACKGROUND OF THE ART

Aircraft engines such as gas turbine engines may be susceptible to increase wear and/or failures when some types of particles are ingested in the engine inlets. It is thus desirable to minimize ingestion of particles in aircraft engine inlets.

SUMMARY

In one aspect, there is provided an inertial particle separator (IPS) communicating with an engine inlet of an aircraft engine, comprising: an inlet duct defining an intake communicating with an environment of the aircraft engine; an intermediate duct extending from the inlet duct to the engine inlet; a bypass duct in fluid communication with and extending downstream from the inlet duct, the bypass duct defining an outlet communicating with the environment of the aircraft engine, a splitter defined at an intersection of a wall of the bypass duct and a wall of the intermediate duct; a splitter vane within the intermediate duct and having a leading edge located upstream of the splitter relative to a flow circulating through the IPS, the splitter vane and the wall of the intermediate duct defining a channel therebetween; and a porous plate extending across the channel and defining openings sized so as to aggregate ice and be blocked by ice under icing conditions.

In another aspect, there is provided an inertial particle separator (IPS) communicating with an engine inlet of an aircraft engine, comprising: an inlet duct defining an intake communicating with an environment outside the aircraft engine; an intermediate duct extending from the inlet duct to the engine inlet; a bypass duct in fluid communication with and extending downstream from the inlet duct, the bypass duct defining an outlet communicating with the environment of the aircraft engine, a splitter provided at an intersection of a wall of the bypass duct and a wall of the intermediate duct; a channel extending through both of the wall of the bypass duct and the wall of the intermediate duct; and a porous plate located across the channel and defining openings sized so as to aggregate icing droplets and be blocked by an ice coating under icing conditions.

In yet another aspect, there is provided a method of separating particles from a flow of ambient air in an aircraft engine, comprising: receiving the flow of ambient air from an environment outside the aircraft engine within an inlet duct; in non-icing conditions, splitting the flow of ambient air at an intersection between an intermediate duct stemming from the inlet duct and a bypass duct extending downstream of the inlet duct; and in icing conditions, circulating icing particles through a porous plate extending across a channel defined between a splitter vane within the intermediate duct and a wall of the intermediate duct, and splitting the flow of ambient air at a leading edge of the splitter vane upstream of the intersection upon the channel being clogged by ice.

DESCRIPTION OF THE DRAWINGS

Reference is now made to the accompanying figures in which.

DETAILED DESCRIPTION

Figure 1:
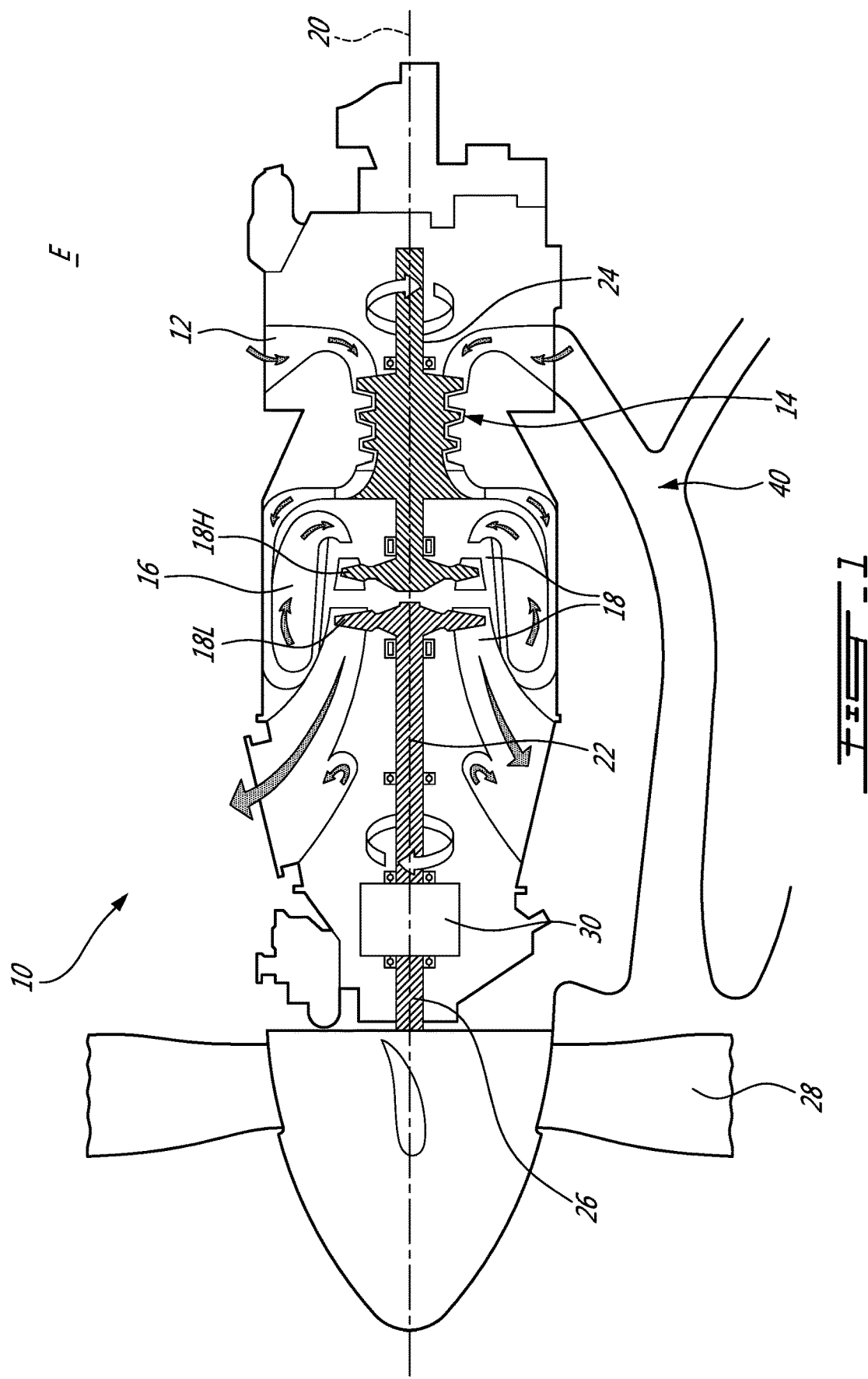
FIG. 1 is a schematic cross sectional view of an aircraft engine such as a gas turbine engine.

FIG. 1 illustrates an aircraft engine such as a gas turbine engine 10 of a type preferably provided for use in subsonic flight, generally comprising in serial flow communication an engine inlet 12 through which ambient air is received, a compressor section 14 for pressurizing the air, a combustor 16 in which the compressed air is mixed with fuel and ignited for generating an annular stream of hot combustion gases, and a turbine section 18 for extracting energy from the combustion gases.

The engine 10 includes at least one rotatable shaft defining a central axis 20 of the engine. In the embodiment shown, two co-axial and independently rotatable shafts are provided: a low pressure or power shaft 22, and a high pressure shaft 24. The high pressure shaft 24 is driven by a high pressure portion 18H of the turbine section 18, and drives the compressor section 14. The low pressure shaft 22 is driven by a low pressure portion 18L of the turbine section 18 which is located downstream of the high pressure portion 18H, and drives an output shaft 26 engaged to a propeller 28; the output shaft 26 is driven through a reduction gearbox 30.

Although the engine 10 is shown as a turboprop engine, it is understood that the engine 10 may have any suitable alternate configuration, including, but not limited to, a turboshaft configuration. Moreover, although the engine 10 is shown as a gas turbine engine, it is understood that the engine may have any other suitable configuration.

Aircraft intake is designed to deliver ambient air flow to engine. It is typically designed to supply air from an environment E outside the engine 10 to the engine while minimizing pressure loss of the air circulating through the intake in different ambient weather conditions to minimize engine fuel consumption. In the meantime, the intake air flow should have less distortion and low swirl at entry of the compressor 14, also referred to as compressor face or engine inlet, before entering the engine to have large surge margin. When the aircraft engine 10 is operating in wet weather, particularly in icing conditions, the intake is configured to bypass a large amount of icing particles directly back and out to the environment E to avoid engine flame out.

Figure 2:
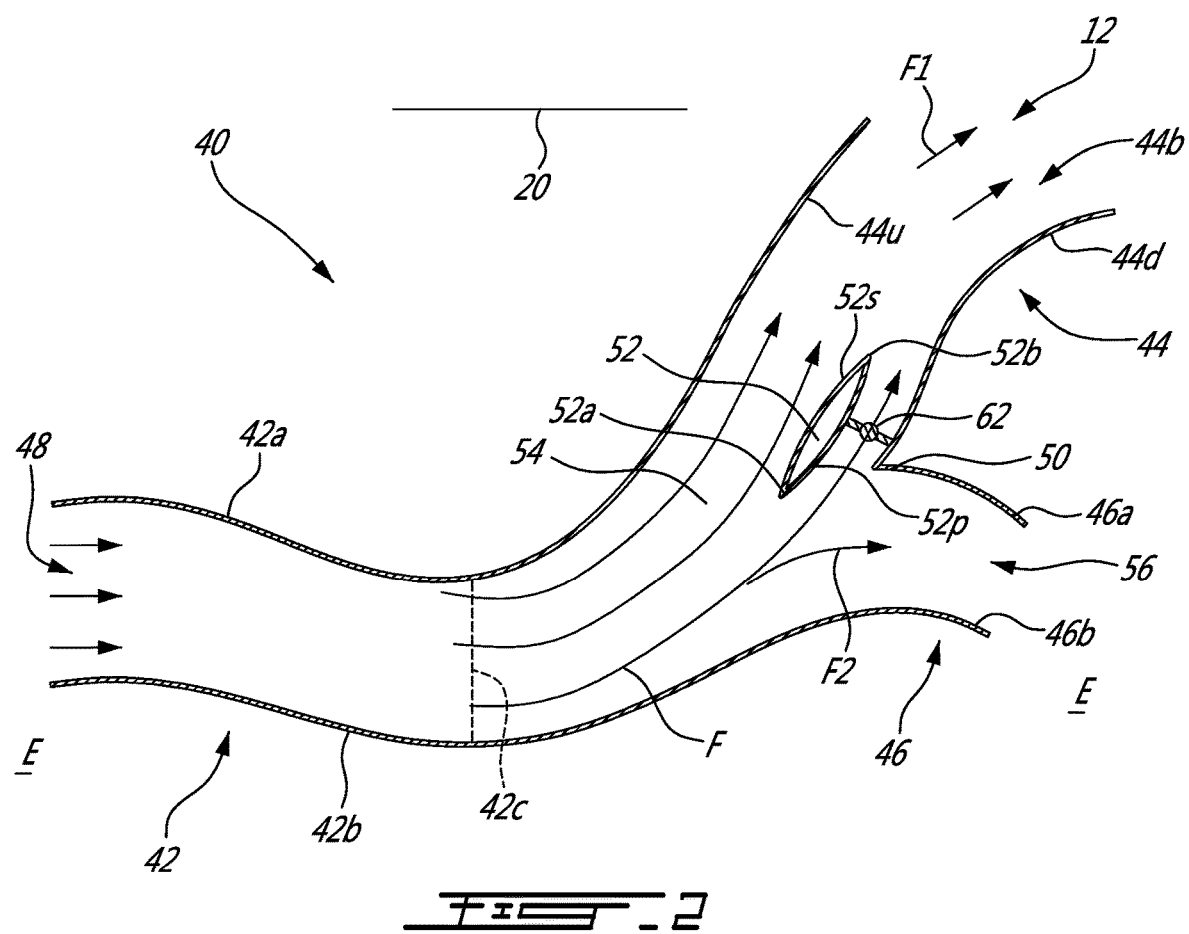
FIG. 2 is a schematic cross sectional view of an inertial particle separator in accordance with one embodiment for the gas turbine engine of FIG. 1; the separator being shown in a non-icing mode.

Referring to FIG. 2, an inertial particle separator (IPS) 40 in accordance with a particular embodiment is shown. The IPS 40 is configured for communicating with the engine inlet 12 (FIG. 1). The particle separator 40 generally includes an inlet duct, also referred to as an aircraft inlet, 42, an intermediate duct, also referred to as an engine entrance duct, 44, and a bypass duct 46.

The inlet duct 42 defines an intake 48 communicating with the environment E outside the engine 10. The inlet duct 42 has a wall having an engine side 42a and an outer side 42b radially spaced from one another, with the outer side 42b being located radially outwardly of the engine side 42a with respect to the central axis 20 of the engine 10, i.e. the engine side 42a is located between the central axis 20 of the engine 10 and the outer side 42b.

In a particular embodiment, the inlet duct 42 has an arcuate cross-section, and the engine and outer sides 42a, 42b may be each defined by wall portions having a concave cross-sectional shape with the concavity being oriented radially inwardly. Opposed wall portions may extend between the engine 10 and outer sides 42a, 42b of the wall. Other configurations may be possible. For example, the inlet duct 42 may have a circular, rectangular, kidney, or oval cross-section, in which case the engine and outer sides 42a, 42b of the wall may be connected to each other in a continuous manner. In a particular embodiment, the inlet, intermediate, and bypass ducts 42, 46, 44 may have an annular shape circumferentially extending all around the central axis 20 of the aircraft engine 10. A plenum or quasi-scroll may then be used to distribute the air exiting the intermediate duct 46 to the compressor section 14.

The intermediate duct 44 is in fluid communication with the inlet duct 42 adjacent its downstream end. The intermediate duct 44 extends radially inwardly, generally transversally to the inlet duct 42, and is connected to the engine inlet 12. The intermediate duct 44 has a wall with axially spaced apart upstream and downstream wall portions 44u, 44d.

Still referring to FIG. 2, the bypass duct 46 is in fluid communication with the inlet duct 42 and intermediate duct 44, and extends downstream from the inlet duct 42. The bypass duct 46 has a wall having an outer side 46b extending from a downstream end of the outer side 42b of the wall of the inlet duct 42. The wall of the bypass duct 46 also has an engine side 46a intersecting the wall of the intermediate duct 44, more particularly the downstream wall portion 44d, at an intersection defining a splitter 50. The inlet duct 42, intermediate duct 44 and bypass duct 46 thus communicate with each other at 54, and together generally define an "inverted T" shape. The bypass duct 46 defines an outlet 56 communicating with the environment E outside the engine 10.

It the present specification, including claims, the terms "intersection" and related terms (e.g. "intersects") are intended to encompass the point of attachment of walls manufactured separately and attached together through any suitable type of attachment, as well a point of transition (e.g., change of direction) between adjacent portions of a monolithic wall.

In the embodiment shown, the inlet duct 42 curves radially away from the central axis 20 of the aircraft engine 10 from the intake 48 to a mid-section 42c of the intermediate duct 42 and curves radially toward the central axis 20 from the mid-section 42b and toward the intermediate duct 44. In the depicted embodiment, the bypass duct 44 extends radially away from the central axis 20 downstream of the splitter 50.

Typically, an ambient air flow F entering the inlet duct 42 of the IPS 40 via the intake 48 splits into two streams F1, F2 one to engine and another to bypass. The location of the splitter 50 influences separation efficiency and loss. When its position is more upstream relative to the flow F, the particles are less likely to go to the intermediate duct 44 because the engine entrance duct area is reduced. In such a case, the separation efficiency is better but the pressure loss becomes worse. A flat icing screen may be mounted at the splitter 50. In the icing condition, the screen becomes iced up and clogged, resulting in higher separation efficiency. However, aerodynamic losses imparted on the flow F1 to the engine 10 when passing around the clogged screen are non-negligible. The pressure loss may surge due to the flow sudden contraction and expansion around the clogged sheet. This might induce high flow distortion and swirl, which are non-desirable.

Still referring to FIG. 2, a splitter vane 52 is located within the intermediate duct 44. The splitter vane 52 has a leading edge 52a located upstream of the splitter 50 relative to the flow F circulating in the inlet duct 42. The splitter vane 52 may have an aerodynamically-shaped profile. In the embodiment shown, the splitter vane 52 has a symmetric airfoil, but any suitable airfoil may be used. The splitter vane 52 may be secured within the intermediate duct 44 via side wall portions of said duct 44 connecting the upstream wall portion 44u to the downstream wall portion 44d. Any suitable way of securing the splitter vane 52 within the intermediate duct 44 is contemplated.

As shown in FIG. 2, the splitter vane 52 is located between the upstream and downstream wall portions 44u, 44d of the intermediate duct 44. The leading edge 52a of the splitter vane 52 may be located radially outwardly of the intersection 50 between the intermediate duct 44 and the bypass duct. Alternatively, the leading edge 52a of the splitter vane 52 may be located radially inwardly of the intersection 50. In other words, a radial distance between the central axis 20 and the leading edge 52a of the splitter vane 52 is greater than that between the central axis 20 and the splitter 50. In the embodiment shown, the leading edge 52a of the splitter vane 52 is located upstream of the intersection 50 relative to the flow F.

Figure 3:
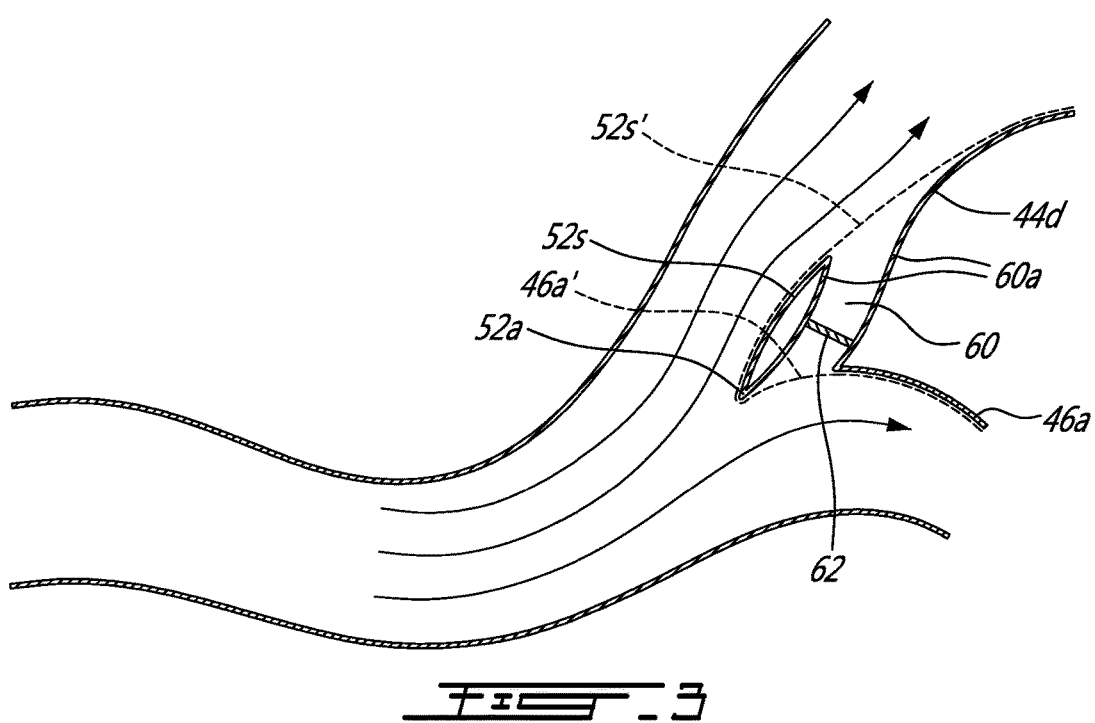
FIG. 3 is a schematic cross sectional view of the inertial particle separator of FIG. 2 shown in an icing mode.

The splitter vane 52 has a pressure side 52p and a suction side 52s opposed to the pressure side 52p. Both of the pressure and suction sides 52p, 52s extend from the leading edge 52a to a trailing edge 52b of the splitter vane 52. As shown in FIG. 3, an extrapolation 52s' of the suction side 52s (shown in dashed line in FIG. 3) of the splitter vane 52 merges with, or is aligned with, the downstream wall portion 44d of the intermediate duct 44. In other words, the vane suction side extrapolation 52s' is tangent with the downstream wall portion 44d of the intermediate duct 44. In the embodiment shown, an extrapolation 46a' (shown in dashed line in FIG. 3) of the engine side 46a of the wall of the bypass duct connects with the leading edge 52a of the splitter vane 52. Such a configuration may allow to better guide particles into the bypass duct 46. An horizontal position of the splitter vane 52 may be adjusted to achieve a balance between high separation efficiency and low pressure loss.

A channel 60 is defined between the splitter vane 52 and the downstream wall portion 44d of the intermediate duct 44.

A cross-sectional area of the channel 60 taken in a plane normal to a direction of an airflow circulating therethrough may be less than half of that of the intermediate duct 44. Stated differently, a distance from the upstream wall portion 44u of the intermediate duct 44 to the splitter vane 52 may be greater than a distance from the splitter vane 52 to the downstream wall portion 44d of the intermediate duct 44.

Still referring to FIGS. 2-3, a porous plate 62 is located across the channel 60. The porous plate may be a perforated pate or a wire screen. The plate 62 may define openings sized so as to aggregate icing droplets and be blocked by an ice coating under icing conditions. The plate 62 may be secured to the downstream wall portion 44d of the intermediate duct 44 and/or to the splitter vane 52. In the present embodiment, the plate 62 is secured to both of the downstream wall portion 44d of the intermediate duct 44 and to the splitter vane 52. The plate 62 may extend perpendicularly to the downstream wall portion 44d of the intermediate duct 44 and/or perpendicularly to the splitter vane 52. In other words, the plate 62 may be normal relative to a flow direction of an airflow circulating within the channel 60. In a particular embodiment, to reduce pressure loss, the porous plate is inclined with respect to the downstream wall portion 44d of the intermediate duct 44 to reduce the flow velocity across the plate. The angle may be adjusted depending of shape of the ducts.

The plate 62 may be located halfway between the leading and trailing edges 52a, 52b of the splitter vane 52. Stated differently, the plate 62 may be secured to the pressure side 52p of the splitter vane 52 at a mid-chord location. The plate 62 may be located at a mid-length of the channel 60. The plate 62 may be located anywhere within the channel 60.

In a particular embodiment, the plate 62 includes or is constituted by a screen (e.g. mesh material). A typical screen is made of wires having a diameter of 0.15 to 3.5 millimetres, preferably 0.6 mm and distanced from one another by a distance of 0.5 to 12 millimetres, preferably 6 mm. Other dimensions are also possible. Alternately, the plate 62 can be configured as a perforated plate, or be defined in part or in whole by open cell material such as honeycomb material. The openings may be circular, square, rectangular, elliptical and any other suitable shape. In a particular embodiment, a ratio of a total surface area of the openings over a surface area of the plate 62 ranges from about 50% to about 90%. Other configurations are also possible.

In icing conditions, the channel 60 becomes ice-blocked or clogged by ice and all the air that reaches the engine inlet 12 circulates through the intermediate duct 44 between the upstream wall portion 44u and the splitter vane 52. In such a case, a splitting location—that is a location where the flow circulating through the inlet duct 42 is split between the intermediate duct 44 and the bypass duct 46—corresponds to the leading edge 52a of the splitter vane 52. In such a case, the cross-sectional area of the intermediate duct in which engine inlet flow can circulate is less, and the separation efficiency of the IPS 40 is greater, than what they would be if the channel 60 were not clogged by ice.

In non-icing conditions, the channel 60 is open and air can pass through the plate 62. In such a case, the splitting location moves downstream of the leading edge 52a of the splitter vane 52 and corresponds to the intersection 50 between the downstream wall portion 44d of the intermediate duct 44 and the engine side 46a of the wall of the bypass duct 46. Therefore, the cross-sectional area of the intermediate duct in which air can circulate is increased compared to that in the icing conditions and pressure loss is decreased compared to that in the icing conditions. In other words, the opening of the channel 60 in non-icing conditions increases the flow area and therefore may decrease pressure loss.

The bypass splitting location of the IPS 40 may be "smartly" movable from the leading edge 52a of the splitter vane 52 to the intersection 50 between the intermediate and bypass ducts 44, 46 between icing and non-icing conditions. The IPS 40 may therefore achieve high separation efficiency and low loss for different ambient weathers. The IPS 40 may achieve high separation efficiency in icing conditions and low pressure loss in both icing and non-icing conditions. The pressure loss in non-icing conditions may be less than that in icing conditions. The airfoil shape of the splitting vane may allow the pressure loss to remain low in icing conditions.

Figure 4:
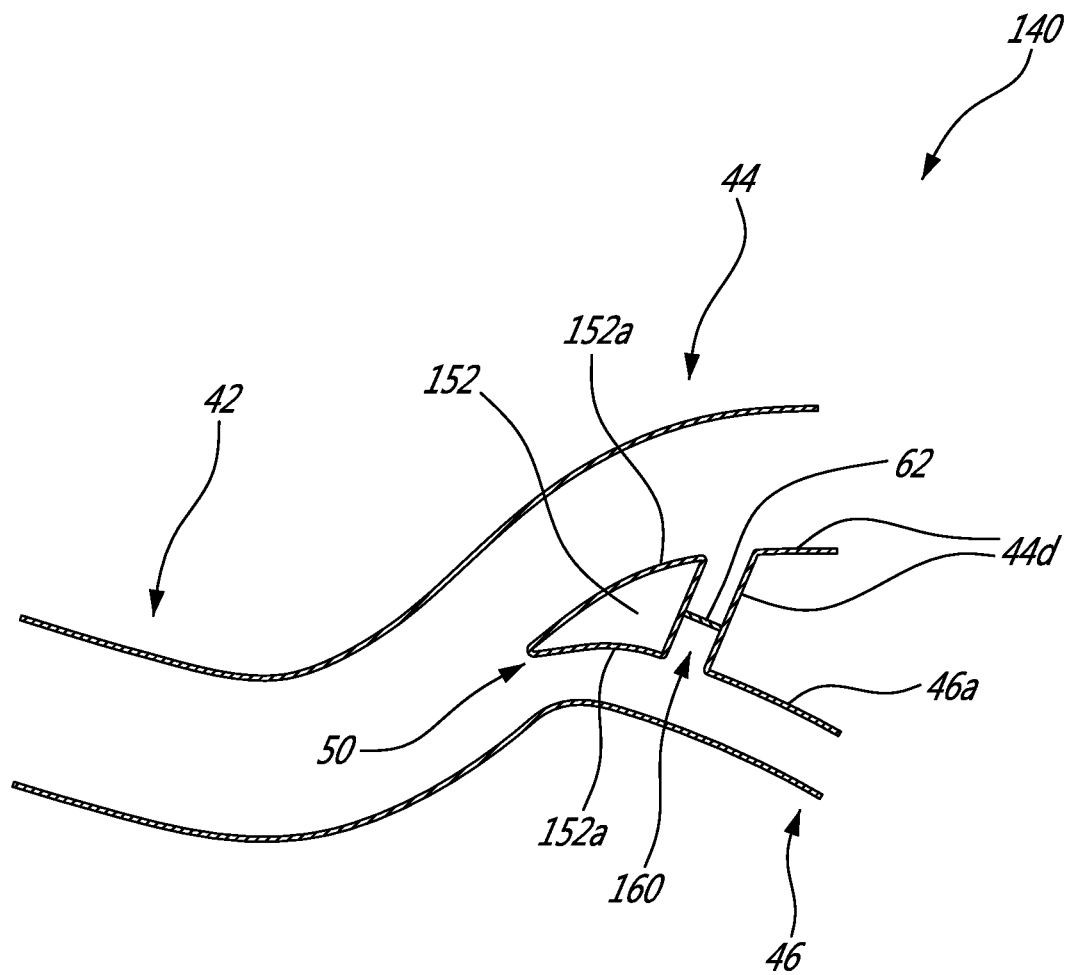
FIG. 4 is a schematic cross sectional view of an inertial particle separator in accordance with another embodiment for the gas turbine engine of FIG. 1.

Referring now to FIG. 4, an IPS in accordance with another embodiment is generally shown at 140. For the sake of conciseness, only elements that differ from the IPS 40 described above with reference to FIGS. 2-3 are described herein below.

In this embodiment of the IPS 140, the channel 160 is defined by a duct connecting the bypass duct 46 to the intermediate duct 44. The channel 160 is located further downstream of the intersection 50 between the intermediate and bypass ducts 44, 46 than the channel 60 of the IPS 40 of FIGS. 2-3. In the present embodiment, the splitter vane corresponds to a splitter body 152 having a substantially triangular shape.

The splitter body 152 has opposed sides 152a each corresponding to a portion of a respective one of the downstream wall portion 44d of the intermediate duct 44 and the engine side 46a of the wall of the bypass duct 46. The IPS 40, 140 may be applied to a bifurcated and non-bifurcated 3D intake design and to a non-bifurcated single intake duct design.

Referring to FIGS. 2-4, in a particular embodiment, the IPS 40 is initially designed to have a high particle separation efficiency and low pressure loss in icing operating conditions. That is, in the IPS designed for icing operating conditions, the splitter vane 52 is absent and the suction side 52s of what belongs to the splitter vane 52 in FIGS. 2-3 forms part of the downstream wall portion 44d of the intermediate duct 44. Similarly, the engine side 46a of the bypass duct 46 extends such that the splitter, or intersection 50, is located at the leading edge 52a of the splitter vane 52. Once the IPS is designed for high separation efficiency at icing operating conditions, the channel 60 is generated thereby creating the splitter vane 52 (or the splitter body 152 of FIG. 4). The channel 60 is in fluid communication with both of the bypass duct 46 and the intermediate duct 44. The channel 60 may allow to further reduce the pressure loss compared to the configuration before the channel 60 is generated.

The channel 60 may be generated by forming apertures through the engine side 46a of the bypass duct 46 and through the downstream wall portion 44d of the intermediate duct 44. Side walls 60a may be added to complete the channel 60. In the embodiment shown, the side walls 60a of the channel 60 define the pressure side 52p of the splitter vane 52 and a portion of the downstream wall portion 44d of the intermediate duct 44. In other words, the splitter vane 52 may be defined by one of the opposed side walls 60a of the channel 60 and by a portion of the downstream wall portion 44d of the intermediate duct 44 that extends from the leading edge 52a to the channel 60. For the IPS 140 of FIG. 4, the splitter body 152 may be defined by one of opposed side walls of channel 160, by a portion (denoted by 152a on FIG. 4) of the engine side 46a of the wall of the bypass duct 46, and by a portion (denoted by 152a on FIG. 4) of the downstream wall portion 44d of the intermediate duct 44. The channel 60 may be defined through a portion of the engine side 46a of the wall of the bypass duct 46; the portion extending radially toward the central axis 20 of the aircraft engine 10 in a downstream direction relative to the flow F.

For separating particles of ice from a flow of ambient air in an aircraft engine, the flow of ambient air is received from the environment E outside the aircraft engine 10 within the inlet duct 42. In non-icing conditions, the flow of ambient air is split at the intersection 50 between the intermediate duct 44 stemming from the inlet duct 42 and the bypass duct 46 extending downstream of the inlet duct 42. In icing conditions, the icing particles are circulated through the porous plate 62 extending across the channel 60 defined between the splitter vane 52 within the intermediate duct 44 and the downstream wall portion 44d of the intermediate duct 44. The flow of ambient air is split at the leading edge 52a of the splitter vane 52 being located upstream of the intersection 50 upon the channel 60 being clogged by ice.

The In the embodiment shown, circulating the icing particles through the porous plate 62 includes circulating the icing particles through a screen made with wires having a diameter ranging from 0.15 to 3.5 millimeters and spaced apart from one another by a distance ranging from 0.5 to 12 millimeters.

Embodiments disclosed herein include:

A. An inertial particle separator (IPS) communicating with an engine inlet of an aircraft engine, comprising: an inlet duct defining an intake communicating with an environment of the aircraft engine; an intermediate duct extending from the inlet duct to the engine inlet; a bypass duct in fluid communication with and extending downstream from the inlet duct, the bypass duct defining an outlet communicating with the environment of the aircraft engine, a splitter defined at an intersection of a wall of the bypass duct and a wall of the intermediate duct; a splitter vane within the intermediate duct and having a leading edge located upstream of the splitter relative to a flow circulating through the IPS, the splitter vane and the wall of the intermediate duct defining a channel therebetween; and a porous plate extending across the channel and defining openings sized so as to aggregate ice and be blocked by ice under icing conditions.

B. An inertial particle separator (IPS) communicating with an engine inlet of an aircraft engine, comprising: an inlet duct defining an intake communicating with an environment outside the aircraft engine; an intermediate duct extending from the inlet duct to the engine inlet; a bypass duct in fluid communication with and extending downstream from the inlet duct, the bypass duct defining an outlet communicating with the environment of the aircraft engine, a splitter provided at an intersection of a wall of the bypass duct and a wall of the intermediate duct; a channel extending through both of the wall of the bypass duct and the wall of the intermediate duct; and a porous plate located across the channel and defining openings sized so as to aggregate icing droplets and be blocked by an ice coating under icing conditions.

Embodiments A and B may include any of the following elements in any combinations:

Element 1: the splitter vane has an airfoil-shaped cross-section. Element 2: an extrapolation of the wall of the bypass duct connects the leading edge of the splitter vane and wherein an extrapolation of a suction side of the splitter vane tangentially merges with the wall of the intermediate duct. Element 3: the leading edge of the splitter vane is located radially outwardly of the splitter relative to a central axis of the aircraft engine. Element 4: the inlet duct curves radially away from a central axis the aircraft engine from the intake to a mid-section of the inlet duct and curves radially toward the axis of rotation from the mid-section to the splitter. Element 5: the bypass duct extends radially away from a central axis of the aircraft engine downstream of the splitter. Element 6: the splitter vane has a chord length extending from the leading edge to a trailing edge thereof, the plate located at mid-chord between the leading edge and the trailing edge. Element 7: the plate perpendicularly intersects the splitter vane and/or the wall of the intermediate duct. Element 8: the porous plate is a screen made with wires having a diameter ranging from 0.15 to 3.5 millimeters and spaced apart from one another by a distance ranging from 0.5 to 12 millimeters. Element 9: the channel has opposed side walls, a splitter vane defined by one of the opposed side walls of the channel and by a portion of the wall of the intermediate duct extending from the intersection to the channel. Element 10: the intersection is defined by a leading edge of the splitter vane. Element 11: the channel is defined through a portion of the wall of the bypass duct that extends radially toward a central axis of the aircraft engine in a downstream direction relative to a flow circulating through the bypass duct. Element 12: the inlet duct curves radially away from an axis of rotation of the aircraft engine from the intake to a mid-section of the inlet duct and curves radially toward the axis of rotation from the mid-section to the splitter. Element 13: the bypass duct extends radially away from an axis of rotation of the aircraft engine downstream of the splitter. Element 14: the porous plate is located at mid-length of the channel. Element 15: the plate is normal relative to a flow direction of an airflow circulating therethrough. Element 16: a cross-sectional area of the channel is less than that of the intermediate duct.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. An inertial particle, separator (IPS) communicating with an engine inlet of an aircraft engine, comprising:
    an inlet duct defining an intake communicating with an environment outside of the aircraft engine;
    an intermediate duct extending from the inlet duct to the engine inlet;
    a bypass duct in fluid communication with and extending from the inlet duct in a downstream direction relative to a flow circulating through the IPS, the bypass duct defining an outlet communicating with the environment outside of the aircraft engine;
    a splitter defined at an intersection of a wall of the bypass duct and a wall of the intermediate duct;
    a splitter vane within the intermediate duct and having a leading edge located upstream of the splitter relative to the flow circulating through the IPS, the splitter vane and the wall of the intermediate duct defining a channel therebetween; and
    a porous plate extending across the channel and defining openings sized so as to aggregate ice such that the channel is blocked by ice under icing conditions.

2. The IPS of claim 1, wherein the splitter vane has an airfoil-shaped cross-section.

3. The IPS of claim 1, wherein an extrapolation of the wall of the bypass duct connects to the leading edge of the splitter vane and wherein an extrapolation of a suction side of the splitter vane tangentially merges with the wall of the intermediate duct.

4. The IPS of claim 1, wherein the leading edge of the splitter vane is located radially outwardly of the splitter relative to a central axis of the aircraft engine.

5. The IPS of claim 1, wherein the inlet duct curves radially away from a central axis of the aircraft engine from the intake to a mid-section of the inlet duct and curves radially toward the central axis of the aircraft engine rotation from the mid-section to the splitter.

6. The IPS of claim 1, wherein the bypass duct extends radially away from a central axis of the aircraft engine downstream of the splitter.

7. The IPS of claim 1, wherein the splitter vane has a chord length extending from the leading edge of the splitter vane to a trailing edge of the splitter vane, the porous plate located at mid-chord between the leading edge and the trailing edge.

8. The IPS of claim 1, wherein the porous plate perpendicularly intersects the splitter vane and/or the wall of the intermediate duct.

9. The IPS of claim 1, wherein the porous plate is a screen made with wires, each having a diameter ranging from 0.15 to 3.5 millimeters and spaced apart from one another by a distance ranging from 0.5 to 12 millimeters to form the openings.

10. An inertial particle separator (IPS) communicating with an engine inlet of an aircraft engine, comprising:
- an inlet duct defining an intake communicating with an environment outside the aircraft engine;
- an intermediate duct extending from the inlet duct to the engine inlet;
- a bypass duct in fluid communication with and extending downstream from the inlet duct, the bypass duct defining an outlet communicating with the environment outside of the aircraft engine;
- a splitter defined at an intersection of a wall of the bypass duct and a wall of the intermediate duct;
- a channel defined through the splitter and extending from the wall of the bypass duct to the wall of the intermediate duct; and
- a porous plate extending across the channel and defining openings sized so as to aggregate icing droplets and be blocked by an ice coating under icing conditions.

11. The IPS of claim 10, wherein the channel has opposed side walls each extending from the wall of the bypass duct to the wall of the intermediate duct, a splitter vane defined by one of the opposed side walls of the channel and a first portion of the wall of the intermediate duct extending from the intersection to the channel.

12. The IPS of claim 11, wherein the intersection is defined by a leading edge of the splitter vane.

13. The IPS of claim 10, wherein the channel is defined through a portion of the wall of the bypass duct where the wall of the bypass duct extends radially toward a central axis of the aircraft engine in a downstream direction relative to a flow circulating through the bypass duct.

14. The IPS of claim 10, wherein the inlet duct curves radially away from an axis of rotation of the aircraft engine from the intake to a mid-section of the inlet duct and curves radially toward the axis of rotation from the mid-section to the splitter.

15. The IPS of claim 10, wherein the bypass duct extends radially away from an axis of rotation of the aircraft engine downstream of the splitter.

16. The IPS of claim 10, wherein the porous plate is located at a mid-length of the channel.

17. The IPS of claim 10, wherein the porous plate is normal relative to a flaw direction of an airflow circulating therethrough.

18. The IPS of claim 10, wherein a cross-sectional area of the channel is less than that of the intermediate duct.

* * * * *